United States Patent
Geoghegan et al.

[15] 3,683,087
[45] Aug. 8, 1972

[54] FUNGICIDAL COMPOSITION CONTAINING 2-ISOXAZOLIN-5-ONE AND METHOD OF USING THE SAME

[72] Inventors: Michael Joseph Augustine Geoghegan; John Angus William Turner; Peter Frank Hilary Freeman, all of Bracknell, England; Lindsay Anderson Summers, New Castle, Australia

[73] Assignee: Imperial Chemical Industries Limited, London, England

[22] Filed: April 21, 1967

[21] Appl. No.: 647,576

Related U.S. Application Data

[60] Division of Ser. No. 433,162, Feb. 16, 1965, Pat. No. 3,370,064, which is a continuation-in-part of Ser. No. 147,741, Oct. 16, 1961, abandoned.

[52] U.S. Cl. ..............................424/272, 99/153
[51] Int. Cl. ..........................A01n 9/22, A01n 9/28
[58] Field of Search ........167/33 A; 424/272; 99/153

[56] References Cited

UNITED STATES PATENTS 3,312,690   4/1967   Masuda et al..........424/272 X
3,326,931   6/1967   Narayanan et al.....424/272 X

*Primary Examiner*—Albert T. Meyers
*Assistant Examiner*—D. R. Mahanand
*Attorney*—Cushman, Darby & Cushman

[57] ABSTRACT

The present invention is directed to the novel fungicidal compositions containing 2-isoxazolin-5 and one method using the same.

20 Claims, No Drawings

FUNGICIDAL COMPOSITION CONTAINING 2-ISOXAZOLIN-5-ONE AND METHOD OF USING THE SAME

This application is a division of our copending application, Ser. No. 433,162, filed Feb. 16, 1965 (U.S. Pat. No. 3,370,064) which is a continuation-in-part of Serial No. 147,741, filed Oct. 26, 1961, now abandoned.

This invention relates to the use as fungicides of 2-isoxazolin-5-ones, to new 2-isoxazolin-5-ones and to processes for their preparation.

The invention includes fungicidal compositions comprising as active ingredient a 2-isoxazolin-5-one of the formula:

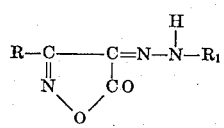

where R is a carboxymethyl or carboxyethyl radical, or an alkyl radical of one to six carbon atoms (especially one to four carbon atoms), such as methyl, ethyl, propyl and butyl, optionally having a substituent hydroxy or cyano group or a halogen atom and $R_1$ is a substituted or unsubstituted phenyl or naphthyl radical, and a carrier for the active ingredient, said carrier comprising a solid inert diluent, or a liquid diluent containing a surface active agent.

Where the group $R_1$ is a substituted phenyl or naphthyl radical the substituents can be, for example, one or more of the following: alkyl and alkoxy radicals of from 1 to 12 and especially from one to four carbon atoms, cycloalkyl, aryl, (or substituted aryl), arylazo (or substituted arylazo), aryloxy, halogen, carboxy, alkoxycarbonyl, carboamino, cyano, nitro, hydroxyl, trifluoromethyl, amino, N-alkylamino, N,N-dialkylamino, sulphonic acid, sulphonamido, aminosulphonyl or thiocyanate radicals.

It has been found that compounds where the group $R_1$ is a chloro-substituted phenyl radical or a lower alkyl-substituted phenyl radical possess useful fungicidal properties as is shown in the Examples. Examples of di-substituted phenyl radicals are those in which the substituents are two alkyl or two alkoxy radicals, two atoms of any of the halogens, alkyl and alkoxy, alkyl and nitro, alkoxy and nitro, alkyl and halogen or alkoxy and halogen.

The compound used as active ingredient can if desired be in the form of one of its salts, for example its sodium or potassium salt.

Some of the compounds of the invention have been found to be very effective when applied as foliage fungicides, some when applied as seed-dressings and some as soil fungicides; and the exact form of the fungicidal composition depends to a large extent upon the use to which the composition is to be put and the pathogen which it is wished to control. For example, the compositions can be powders, solutions, dispersions or pastes. Where they are powders they can be ones in which the active ingredient is in admixture with a powder diluent. Where the composition is liquid it can be one in which the active ingredient is dissolved or suspended in a suitable liquid, for example water or a suitably non-phytotoxic liquid. The ingredients used with the active ingredient in any of the fungicidal compositions of this invention can be substances known to the art as being suitable in the formulation of fungicidal compositions, for example surface active substances such as wetting and dispersing agents, binders, stickers, corrosion inhibitors and stabilizing agents.

Fungicidal compositions of the invention which have been found to be useful as liquid seed dressings are solutions of the sodium salt of 3-methyl-4-phenylhydrazono-2-isoxazolin-5-one in β-ethoxyethanol, diacetonyl alcohol or ethylene glycol, and in particular solutions in which the sodium salt is present in a proportion of about 25% w/v.

The invention also consists in the new 2-isoxazolin-5-ones of the general formula:

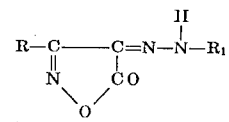

where R is an alkyl radical of 2-6 (especially 2-4) carbon atoms, a carboxyalkyl or alkoxycarbonylalkyl radical of not more than four carbon atoms, and $R_1$ is a substituted or unsubstituted phenyl or naphthyl radical; or where R is an alkyl radical of 1-6 (especially one to four) carbon atoms or a carboxyalkyl or alkoxycarbonylalkyl radical of not more than four carbon atoms and $R_1$ is a chloro-substituted phenyl radical; and their salts.

The 2-isoxazolin-5-ones useful as active ingredients in the fungicidal compositions of his invention can be obtained, for example, by a process in which there is reacted together a keto-ester of the formula:

where R is an alkyl radical of 1-6 (especially one to four) carbon atoms or a carboxyalkyl or an alkoxycarbonylalkyl radical of not more than four carbon atoms and $R_3$ is an alkyl radical of one to four carbon atoms, the appropriate substituted or unsubstituted phenyl or naphthyl diazonium salt and hydroxylamine or a salt of hydroxylamine. The process is conveniently performed with the reactants dissolved or dispersed in water or in a mixture of water and ethanol. The diazonium salt can be conveniently produced in situ by the reaction of the appropriate amine and nitrous acid as is illustrated in the Examples of this specification.

A second process for the preparation of the 2-isoxazolin-5-ones is one in which an azo compound of the formula:

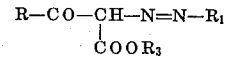

where R and $R_3$ have the meanings given to them in connection with the first process described above and $R_1$ is a substituted or unsubstituted phenyl or naphthyl radical, is reacted with hydroxylamine or a salt thereof. This process is conveniently carried out in mildly alkaline conditions, for example with the reactants dissolved or dispersed in water or in a mixture of water and ethanol and in the presence of caustic alkali or sodium acetate, or in pyridine. Since reaction at room temperature is generally slow the process is preferably carried out at an elevated temperature, for example at a temperature in the range 60°–115° C. The azo compound used in this second process can conveniently be obtained in situ by the reaction of a keto-ester of formula:

$$R - CO - CH_2 - COOR_3$$

and the appropriate diazonium salt.

In the preparation of compounds of this invention where the group R is a methyl group satisfactory results have been obtained using diketene instead of the keto-ester.

The invention also consists in a method of combating plant pathogens, in which the foliage of a plant susceptible to such pathogens, seed from which the plant can be grown or soil in which the plant is to be grown, is treated with a compound or fungicidal composition as herein-described.

The invention is illustrated by the following Examples:

EXAMPLE 1

Ethyl acetoacetate (6.6 g.), hydroxylamine hydrochloride (3.5 g.), m-toluidine (5.4 g.) and concentrated aqueous hydrochloric acid (10 ml.) were mixed with water (25 ml.) and the mixture was cooled to about 5°C. A cold aqueous solution of sodium nitrite (4.0 g.) in water (10 ml.) was added slowly to the mixture with stirring, care being taken that the temperature did not rise above 10° C. The mixture was then stirred for 6 hours, the temperature being allowed during this time to rise slowly to about 20° C, and filtered. The solid residue which was obtained on the filter was washed with water and crystallized from a mixture of ethanol and benzene. The product thus obtained was 3-methyl-4-(3'-methylphenyl-hydrazono-2-isoxazolin -5-one, as yellow crystals, m.p. 172° C.

EXAMPLE 2

3-Chloro-4-methylaniline (7.1 g.) was suspended in water (60 ml.) and the mixture acidified with concentrated aqueous hydrochloric acid (18 ml.). After cooling to 5° C. the mixture was diazotized with a solution of sodium nitrite (4.0 g.) in water (15 ml.). The solution so obtained was then added slowly with stirring to a cold (5° C.) mixture of ethyl acetoacetate (6.6 g.) in ethanol (170 ml.) and water (45 ml.) to which had been added anhydrous sodium acetate, (24 g.). The mixture was allowed to stand at about 20° C. for 15 hours, filtered and the solid residue obtained on the filter washed with water. The residue was dissolved in boiling ethanol (100 ml.) and to this solution there was added slowly a hot solution of hydroxylamine hydrochloric (3.5 g.) in water (100 ml.) to which had been added anhydrous sodium acetate (8.2 g.). The mixture so obtained was heated under reflux for 15 minutes, allowed to stand for 15 hours at about 20° C and filtered. The solid residue which was obtained on the filter was washed with water and crystallized from ethanol. The product thus obtained was 3-methyl-4-(3'-chloro-4'-methylphenylhydrazono-2-isoxazolin-5-one as yellow crystals, m.p. 192° C.

EXAMPLES 3 – 33

A number of other 2-isoxazolin-5-ones have been prepared by the general methods described above in Examples 1 and 2, but using the appropriate amine in each instance instead of m-toluidine and 3-chloro-4-methylaniline used respectively in those Examples. These other 2-isoxazolin-5-ones are set out in the table below as Examples 3-33. The products of Examples 3-15 were obtained by the process of Example 1 while those of Examples 16-33 were obtained by the process of Example 2. The products of Examples 3-33 are believed to all have the general formula:

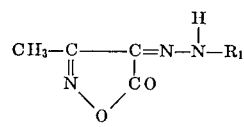

where $R_1$ is a substituted benzene ring and the products are identified in each Example by the meaning given to $R_1$ in the column having that heading. for the sake of convenience the double bonds have been omitted from all the benzene rings shown. The melting point shown against each product is that obtained using a sample of the product which had been purified by recrystallization.

TABLE I

| Example No. | $R_1$ | M.P. (° C.) | Appearance |
|---|---|---|---|
| 3 | —⟨ ⟩—OMe (para) | 193 | Yellow crystals. |
| 4 | —⟨ ⟩—OMe | 208 | Orange crystals. |
| 5 | —⟨ ⟩ with Me, Me | 150 | Do. |
| 6 | —⟨ ⟩—Cl | 192 | Yellow crystals. |
| 7 | —⟨ ⟩ with Cl | 168 | Orange crystals. |
| 8 | —⟨ ⟩ with Me, Me | 142 | Do. |
| 9 | —⟨ ⟩ with EtO | 140 | Do. |
| 10 | —⟨ ⟩—OEt | 150 | Do. |
| 11 | —⟨ ⟩ with O₂N | 214 | Yellow crystals. |
| 12 | —⟨ ⟩ with Me, Me | 199 | Do. |
| 13 | —⟨ ⟩ with Me, Me | 136 | Orange crystals. |

Table I—Continued

| Example No. | Product R₁ | M.P. (°C.) | Appearance |
|---|---|---|---|
| 14 | 4-NO₂-phenyl | 205 | Brown crystals. |
| 15 | 2,4,6-trimethylphenyl | 128 | Orange crystals. |
| 16 | 2-methyl-4-chlorophenyl | 148 | Do. |
| 17 | 2,6-dimethylphenyl | 171 | Do. |
| 18 | 2,4-dichlorophenyl | 193 | Yellow crystals. |
| 19 | 2-bromophenyl | 163 | Brown crystals. |
| 20 | 2-methyl-4-chlorophenyl | 194 | Yellow crystals. |
| 21 | 2-chloro-5-methylphenyl | 148 | Do. |
| 22 | 2,6-dichlorophenyl | 170 | Do. |
| 23 | 2,5-dichlorophenyl | 182 | Do. |
| 24 | 2-methyl-5-chlorophenyl | 168 | Do. |
| 25 | 2-bromophenyl | 145 | Do. |
| 26 | 4-fluorophenyl | 165 | Orange crystals. |
| 27 | 2-fluorophenyl | 200 | Yellow crystals. |
| 28 | 2,5-dichlorophenyl | 160 | Do. |
| 29 | 2-bromo-4-fluorophenyl | 182 | Red crystals. |
| 30 | 2-CF₃-phenyl | 198 | Orange crystals. |
| 31 | 2-COOEt-phenyl | 96 | Yellow crystals. |
| 32 | 4-EtOOC-phenyl | 120 | Do. |
| 33 | phenyl-N=N-phenyl | 208 | Brick-red crystals. |

EXAMPLE 34 ethylacetoacetate (6.6 g.), hydroxylamine hydrochloride (3.5 g.), m-chloroaniline (6.4 g.) and concentrated aqueous hydrochloric acid (10 ml.) were added to ethanol (10 ml.) and the mixture cooled to about 5° C. A cold aqueous solution of sodium nitrite (4.0 g.) in water (10 ml.) was added slowly to the mixture with stirring so that the temperature did not exceed 10° C. The mixture was then stirred for a further 6 hours, the temperature being allowed during this time to rise slowly to about 20° C., and filtered. The solid residue which was obtained on the filter was washed with water and crystallized from a mixture of ethanol and benzene. The product thus obtained was 3-methyl-4-(3'-chlorophenylhydrazono)-2-isoxazolin-5-one as brown crystals, m.p. 162° C.

EXAMPLE 35 p-Ethylaniline (6.1 g.) was suspended in water (60 ml.) and the mixture acidified with concentrated aqueous hydrochloric acid (18 ml.). After cooling to 5° C. the mixture was diazotized with a solution of sodium nitrite (4.0 g.) in water (15 ml.). The resulting solution was added slowly with stirring to a cold (5° C.) mixture of ethyl acetoacetate (6.6 g.) in ethanol (170 ml.) and water (45 ml.) to which had been added anhydrous sodium acetate (24 g.). The mixture was allowed to stand at about 20° C. for 15 hours and the heavy oil which was obtained was separated from the aqueous layer and washed with water. The washed oil was dissolved in boiling ethanol (100 ml.) and to this solution there was added slowly a hot solution of hydroxylamine hydrochloride (3.5 g.) in water (100 ml.) to which had been added anhydrous sodium acetate (8.2 g.). The mixture so obtained was heater under reflux for 15 minutes, allowed to stand for 15 hours at about 20° C. and filtered. The solid residue which was obtained on the filter was washed with water and crystallized from ethanol. The product thus obtained was 3-methyl-4-(4'-ethylphenylhydrazono)-2-isoxazolin-5-one as yellow crystals, m.p. 154° C.

EXAMPLE 36

The process described in Example 35 was repeated except that the p-ethylaniline (6.1 g.) was replaced by o-ethylaniline (6.1 g.). The product when crystallized from ethanol was 3-methyl-4-(2'-ethyl-phenylhydroazono)-2-isoxazolin-5-one as orange crystals, m.p. 122° C.

Examples 37, 38 and 39 describe the preparation of various salts of 2-isoxazolin-5-ones.

EXAMPLE 37

3-Methyl-4-(3'-methylphenylhydrazono)-2-isoxazolin-5-one (3 g. of the compound obtained as the product of Example 1 above) was suspended in 10 percent aqueous sodium hydroxide solution (30 ml.) and ethanol (30 mo.) was added. The mixture was heated at about 80° C. for 2 minutes and the resultant solution was filtered. On cooling the resulting filtrate, a crystalline solid precipitated which was removed by filtration and was washed with ether. The product thus obtained was the sesquihydrate of the sodium salt of 3-methyl-4-(3'-methylphenyl-hydrazono)-2-isoxazolin-5-one as yellow needles which slowly decomposed on heating but were not completely fused at 300° C.

EXAMPLE 38

The process described in Example 37 was repeated except that the 3-methyl-4-(3'-methylphenyl-hydrazono)-2-isoxazolin-5-one (3 g.) was replaced by 3-methyl-4-(4'-chlorophenylhydrazono)-2-isoxazolin-5-one (3 g. of the compound obtained as product of Example 6 above). The product was the trihydrate of the sodium salt of 3-methyl-4-(4'-chlorophenyl-hydrazono)-2isoxazolin-5-one as yellow crystals, m.p. 170° C. with decomposition.

EXAMPLE 39

The process described in Example 37 was repeated except that the 3-methyl-4-(3'-methylphenyl-hydrazono)-2-isoxazolin-5-one (3 g.) was replaced by 3-methyl-4-(4'-chlorophenylhydrazono)-2-isoxazolin-5-one (3 g. of the compound obtained as product of Example 6 above) and the 10 percent aqueous sodium hydroxide (30 ml.) by 10 percent aqueous potassium hydroxide (30 ml.). The product was the sesquihydrate of the potassium salt of 3-methyl-4-(4'-chlorophenyl-hydrazono)-2-isoxazolin-5-one as yellow crystals which decomposed at 170°–180° C.

EXAMPLE 40

This Example describes the preparation of 3-methyl-4-(2':4':5'2-isoxazolin-5-one by a process which is a modification of the general process described in Example 2 above. The modification consists essentially of the use of pyridine, in place of ethanol, in the process's third stage where the product of the diazonium salt and the keto-ester is reacted with hydroxylamine hydrochloride.

The wet, crude intermediate (23 g.) obtained by reacting ethyl aceto-acetate (6.5 g.) with 2:4:5-trichlorophenyl-diazonium chloride by the general method of Example 2 was mixed with hydroxylamine hydrochloride (3.5 g.) and pyridine (75 ml.) and the mixture was refluxed for 1 hour. The product obtained was then poured into iced water containing hydrochloric acid and the solid which precipitated was removed by filtration and recrystallized from ethanol yielding 3-methyl-4-(2':4':5'2-isoxazolin-5-one as a reddish-brown solid, m.p. 151° C.

EXAMPLES 41 – 78

A number of other 2-isoxazolin-5-ones have been prepared by the general method described in Examples 1, 2 or 40 above, but using various keto-esters and the appropriate amine in each instance. These 2-isoxazolin-5-ones are set out in Table II below as Examples 41 - 78.

The products of Examples 41 – 78 were obtained by processes involving a keto-ester of the formula: $R-CO-CH_2-COOEt$ and a diazonium chloride of formula: $Cl-N=N-R_1$ and are believed to all have a structure corresponding to the general formula:

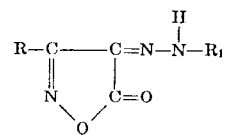

where R is an alkyl or alkoxycarbonylalkyl radical and $R_1$ is a substituted benzene ring.

In Table II the product of each Example is identified by reference to the nature of the groups R and $R_1$, and for the sake of convenience the double bonds have been omitted from all the benzene rings depicted.

With the exceptions of Examples 52, 67, 68, 72, 73, 75 and 76, the compounds of all the Examples in Table II were obtained using the general process described in Example 2 above, but using the appropriate keto-ester and amine in each instance. With regard to the exceptions, the compounds of Examples 67 and 68 were obtained by the general process of Example 1 above; and the compounds of Examples 52, 72, 73, 74 and 76 by the general process of Example 40, using the appropriate keto-ester and amine in each instance.

Table II

| Example No. | R (Product) | $R_1$ | M.P. (° C.) |
|---|---|---|---|
| 41 | $CH_3$ | –⬡– $nC_4H_9$ | 48 |
| 42 | $CH_3$ | –⬡–$nC_4H_9$ | 92 |
| 43 | $CH_3$ | –⬡–$nC_{12}H_{25}$ | 91 |
| 44 | $CH_3$ | –⬡–⬡ | 202 |
| 45 | $CH_3$ | –⬡– $OC_2H_5$ | 162 |
| 46 | $CH_3$ | –⬡–$COOC_2H_5$ | 204 |
| 47 | $CH_3$ | –⬡–OH | 227 |
| 48 | $CH_3$ | –⬡–$N(CH_3)_2$ | 170 |
| 49 | $CH_3$ | –⬡–$SO_2NH_2$ | 226 |
| 50 | $CH_3$ | –⬡–Br | 194 |
| 51 | $CH_3$ | –⬡– | 199 |
| 52 | $CH_3$ | –⬡–SCN | 174 |

Table II—Continued

| Example No. | R | R₁ (Product) | M.P. (°C.) |
|---|---|---|---|
| 53 | CH₃ | cyclohexyl-1-C₂H₅, 4-C₂H₅ | 60 |
| 54 | CH₃ | cyclohexyl-1-OC₂H₅, 4-OC₂H₅ | 151 |
| 55 | CH₃ | cyclohexyl-1-OC₂H₅, 4-OC₂H₅ | 176 |
| 56 | CH₃ | cyclohexyl-1-OC₃H₇(i), 4-OC₃H₇(i) | 124 |
| 57 | CH₃ | cyclohexyl-1-OCH₃, 4-OCH₃ | 187 |
| 58 | CH₃ | cyclohexyl-OCH₃, CH₃ | 146 |
| 59 | CH₃ | cyclohexyl-OC₂H₅, CH₃ | 151 |
| 60 | CH₃ | (CH₃-cyclohexyl)-N=N-(cyclohexyl-CH₃) | 127 |
| 61 | CH₃ | cyclohexyl-NO₂, CH₃ | 190 |
| 62 | CH₃ | cyclohexyl-CH₃, NO₂ | 177 |
| 63 | CH₃ | cyclohexyl-NO₂, CH₃ | 175 |
| 64 | CH₃ | cyclohexyl-CH₃, NO₂ | 199 |
| 65 | CH₃ | cyclohexyl-NO₂, OCH₃ | 208 |
| 66 | CH₃ | cyclohexyl-OCH₃, NO₂ | 184 |
| 67 | C₂H₅ | cyclohexyl | 118 |
| 68 | C₂H₅ | cyclohexyl-CH₃ | 134 |
| 69 | C₂H₅ | cyclohexyl-CH₃ | 135 |
| 70 | C₂H₅ | cyclohexyl-OC₂H₅ | 145 |
| 71 | C₂H₅ | cyclohexyl-Cl | 160 |
| 72 | C₂H₅ | cyclohexyl-Cl, Cl | 150 |
| 73 | nC₄H₉ | cyclohexyl | 83 |
| 74 | C₂H₅—OOC—CH₂ | cyclohexyl | 126 |
| 75 | C₂H₅—OOC—CH₂ | cyclohexyl-CH₃ | 115 |
| 76 | C₂H₅—OOC—CH₂ | cyclohexyl-CH₃ | 113 |
| 77 | C₂H₅—OOC—CH₂ | cyclohexyl-OC₂H₅ | 127 |
| 78 | C₂H₅—OOC—CH₂ | cyclohexyl-Cl | 220 |

EXAMPLES 79 – 88

Table III below includes as Examples 79 – 88 a number of further 2-isoxazolin-5-ones which have been formulated as fungicidal compositions. The various compounds are identified in Table III, as in Tables I and II, by reference to the nature of the groups R and R₁. The double bonds have, for convenience, been omitted from all the structures depicted.

TABLE III

| Example No. | R | R₁ | M.P. (°C.) |
|---|---|---|---|
| 79 | CH₃ | phenyl | 190 |
| 80 | CH₃ | phenyl-CH₃ | 204 |
| 81 | CH₃ | phenyl-CH₃ | 160 |
| 82 | CH₃ | phenyl-CH₃O | 178 |
| 83 | CH₃ | phenyl-HOOC | ¹228 |
| 84 | CH₃ | phenyl-CH₃, CH₃ | 126 |

Table III—Continued

| Example No. | R | R₁ | M.P. (° C.) |
|---|---|---|---|
| 85 | CH₃ | -C₆H₃(CH₃)-Cl | 148 |
| 86 | CH₃ | naphthyl | 208 |
| 87 | CH₃ | naphthyl | 168 |
| 88 | CH₃ | -C₆H₄-NO₂ | 176 |

[1] With decomposition.

Good results have been obtained using fungicidal compositions of this invention as seed dressings, and in Table IV below there is shown compounds which have been found to be active against a number of economically important fungus and bacterial diseases. Similarly, Table V shows compounds found to be active against various foliage fungus diseases. The active ingredients of the compositions tested have been referred to below, for simplicity, by the number of the Examples in Tables I, II or III in which they appear.

Seed Dressings

TABLE IV

| Disease | Crop | Active Ingredient — the product of Example Nos. |
|---|---|---|
| Pythium ultimum | Peas | 5, 11, 16, 17, 79 and 81 |
| Fusarium culmorum | Peas | 6, 7, 10, 26 and 81 |
| Xanthomonas malvacearum | Cotton | 22 |
| Tilletia caries | Wheat | 6, 82 and 84 |

Foliage Fungicides

TABLE V

| Disease | Crop | Active Ingredient — the product of Example Nos. |
|---|---|---|
| Pirisularia oryzae | Rice | 6, 7, 20, 36 and 85 |
| Plasmopara viticola | Vines | 7 |
| Erysiphe cichoracearum | Cucumbers | 1, 7, 10, 81 and 84 |
| Venturia inaequalis | Apples | 7, 19 and 81 |
| Alternaria solani | Tomatoes | 34 and 79 |
| Erysiphe graminis | Oats | 4 and 7 |
| Botrytis fabae | Broad Beans | 19, 26, 39 and 79 |

The compounds of Examples 5, 6, 11, 16, 26, 81, 82 and 84 have been found to be active against the soil-borne disease Rhizoctonia solani.

The fungicidal 4-aryl-hydrazono compounds of the present application were first described as 4-arylazo compounds in Serial No. 147,741. This is due to the fact that the compounds in question can exist in different tautomeric forms. However, in the solid state in which the products described herein are made, these products are more correctly identified with the aryl-hydrazono structure rather than the tautomeric arylazo structure attributed to these same compounds in Ser. No. 147,741.

What we claim is:

1. A fungicidal composition comprising, as the essential active component, a fungicidally effective amount of a 2-isoxazolin-5-one which, in one tautomeric form, has the formula:

$$R-C\underset{N\diagdown_O\diagup CO}{\overset{\|}{\rule{0pt}{1em}}}C=N-\underset{H}{\overset{|}{N}}-R_1$$

wherein R is selected from the group consisting of carboxy-methyl, carboxyethyl, alkyl of one to six carbon atoms, hydroxy-alkyl of one to six carbon atoms, alkoxycarbonylalkyl of one to four carbon atoms, cyanoalkyl of one to six carbon atoms, and halo-alkyl of one to six carbon atoms; and $R_1$ is selected from the group consisting of phenyl and naphthyl radical, and a carrier for said active component, said carrier is selected from the group consisting of solid inert diluents and liquid inert diluents.

2. A fungicidal composition according to claim 1 wherein the active ingredient is one where R is methyl and $R_1$ is chlorophenyl.

3. A fungicidal composition according to claim 1 wherein the active ingredient is one where R is methyl and $R_1$ is lower alkylphenyl.

4. A fungicidal composition according to claim 1 wherein the active ingredient is 3-methyl-4-phenyl-hydrazono-2-isoxazolin-5-one.

5. A fungicidal composition according to claim 1 wherein the active ingredient is 3-methyl-4-(2'-methyl-phenylhydrazono)-2-isoxazolin-5-one.

6. A fungicidal composition according to claim 1 wherein the active ingredient is 3-methyl-4-(2'-chlorophenyl-hydrazono)-2-isoxazolin-5-one.

7. A fungicidal composition according to claim 1 wherein the active ingredient is 3-methyl-4-(3'-chlorophenylhydrazono)-2-isoxazolin-5-one.

8. A fungicidal composition according to claim 1 wherein the active ingredient is 3-methyl-4-(4'-chlorophenylhydrazono)-2-isoxazolin-5-one.

9. A fungicidal composition according to claim 1 wherein the active ingredient is 3-methyl-4-(2'-methyl-4'-chlorophenylhydrazono)-2-isoxazolin-5-one.

10. A fungicidal composition according to claim 1 wherein said active ingredient is in the form of an alkali metal salt.

11. A composition according to claim 1 wherein the carrier is a solid inert diluent which is in powdered form.

12. A composition according to claim 1 wherein the carrier is a non-phytotoxic liquid.

13. A fungicidal seed-dressing composition comprising a solution of an alkali metal salt of 3-methyl-4-phenylhydrazono-2-isoxazolin-5-one in a non-phytotoxic solvent.

14. A fungicidal composition according to claim 13 in which the alkali metal salt is the sodium salt and said salt is present in a proportion of about 25% w/v.

15. A method combatting plant pathogens which comprises applying to the habitat of said pathogens a fungicidally effective amount of a 2-isoxazolin-5-one which in one tautomeric form, has the formula:

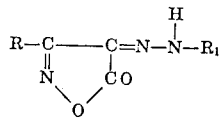

wherein R is selected from the group consisting of carboxy-methyl, carboxyethyl, alkyl of one to six carbon atoms, hydroxy-alkyl of one to six carbon atoms, alkoxycarbonylalkyl of one to four carbon atoms, cyanoalkyl of one to six carbon atoms, and halo-alkyl of one to six carbon atoms; and $R_1$ is selected from the group consisting of phenyl and naphthyl radicals.

16. The method of claim 15 wherein said fungicide is applied to the foliage of a plant susceptible to said pathogens.

17. The method of claim 15 wherein said fungicide is applied to seed from which a plant susceptible to said pathogens is grown.

18. The method of claim 15 wherein said fungicide is applied to soil in which a plant susceptible to said pathogens is grown.

19. A method of combatting plant pathogens according to claim 15 wherein plant seed is treated with said 2-isoxazolin-5-one and the pathogens are selected from the group consisting of *Pythium ultimum, Fusarium culmorum, Xanthomonas malvacearum* and *Tilletia caries*.

20. A method of combatting plant pathogens according to claim 15 wherein foliage susceptible to said pathogens is treated with said 2-isoxazolin-5-one, said pathogens being selected from the group consisting of *Piricularia oryxae, Plasmophora vitocola, Erisiphe cichoraccarum, Venturia inaequalis, Alternaria solani, Brysiphe graminia* and *Botyritis fabae*.

* * * * *

UNITED STATES PATENT OFFICE
CERTIFICATE OF CORRECTION

Patent No. 3,683,087  Dated August 8, 1972

Inventor(s) Michael Joseph Augustine Geoghegan et al

It is certified that error appears in the above-identified patent and that said Letters Patent are hereby corrected as shown below:

In the heading of the patent, add:

--[30] Foreign Application Priority Data

November 2, 1960   Great Britain....37645/60

July 31, 1961    Great Britain....27676/61--

Line 2 of the abstract, "and one" should be --one and--

Column 11, line 49, "Pirisularia" should be --Piricularia--

Column 12, line 24, "radical" should be --radicals-- cichoracearum, Venturia inaequalis, Alternaria solani,

Erysiphe graminis and Botrytis fabae.--

Signed and sealed this 1st day of April 1975.

(SEAL)
Attest:

RUTH C. MASON
Attesting Officer

C. MARSHALL DANN
Commissioner of Patents
and Trademarks